Aug. 30, 1960  O. MAYR  2,950,794

SPEED CONTROL ARRANGEMENT FOR TRACTOR-TYPE VEHICLES

Filed March 11, 1958

INVENTOR

OTMAR MAYR

BY Dicke and Craig

ATTORNEYS

2,950,794

SPEED CONTROL ARRANGEMENT FOR TRACTOR-TYPE VEHICLES

Otmar Mayr, Plochingen, Neckar, Germany, assignor to Firma Dr. Ing. h.c.F. Porsche K.G., Stuttgart-Zuffenhausen, Germany Filed Mar. 11, 1958, Ser. No. 720,715

Claims priority, application Germany Mar. 23, 1957

9 Claims. (Cl. 192—3)

The present invention relates to an arrangement for reducing the vehicle speed of tractors in a continuously variable manner up to the point of standstill thereof with an engaged speed of the change-speed transmission, especially for tractors used in agricultural operations.

In connection with agricultural operations, such as loading of hay or grain, distributing fertilizer, and the like, a one-man operation without requiring repeated remounting of the vehicle has been obtained in the prior art devices for purposes of moving forward, for instance, in a step-by-step manner, in that a friction disk clutch is coordinated to or operatively connected with the speeds of the change-speed transmission used during agricultural operations, which friction disk clutch is independent of the main clutch. By means of an adjusting lever arranged adjacent the usual transmission lever, the vehicle speed of such prior art devices could be reduced up to a complete standstill of the tractor by letting the friction disk clutch slip. However, since the operation of a friction disk clutch is always connected with wear, aside from the readjustment which has to be made within short time intervals, the length of life of such an installation is relatively short, the more so as no control of the engine rotational speed is normally connected therewith. Moreover, the heat developed in the clutch by this slippage may be considerable under certain circumstances.

Furthermore, for purposes of changing the vehicle speed, the operating person had to step within the area between the front and rear wheels of the tractor by reason of the position of the adjusting lever whereby even slight carelessness could readily lead to accidents.

Another type of construction is known in the prior art according to which the tractor is provided, for purposes of remote control, with control means constituted by reins so as to control the tractor in the manner similar to guiding or controlling a horse. This type of installation, however, requires a complicated construction consisting of many parts and ordinarily operates with a centrifugal clutch totally unsuited for the relatively hard and rough operation of a tractor.

According to the present invention, the disadvantages of the prior art constructions are avoided in that a hydraulic clutch is connected ahead of the change-speed transmission, a driven shaft of the torque transmitting means between the power unit such as the internal combustion engine and the driven wheels is adapted to be braked by a brake which need not be actuated from the tractor, and the actuating member for the brake is connected with a control member simultaneously influencing the rotation speed of the internal combustion engine.

By the use of such an arrangement, an installation is obtained which is far-reachingly insensitive and operates with relatively little or no wear, and in which simultaneously the internal combustion engine is always adjusted to operate within a favorable load region.

For purposes of stopping the engine, the usual manual brake installation is used which is additionally under the influence of a further lever projecting beyond the contours of the tractor and which is pivotally connected with the hand brake lever adapted to be actuated from the driver's seat. As a result of such an arrangement, the installation in accordance with the present invention does not require any large expenditures and may also be installed into already existing tractors. Since the additional lever projects beyond the tractor, any danger of accidents is eliminated during actuation thereof by the operator. The additional lever is pivotally supported about the axis of rotation of the manual brake lever and is operatively connected therewith by an extension extending parallel thereto.

A further simplification is achieved in accordance with the present invention if the additional lever and the manual brake lever are provided with a common locking pawl or latch detent mechanism. The additional lever carries an adjustable cable which is operatively connected with an adjusting member of the linkage determining the amount of fuel fed to the engine, for instance, with a connecting rod between the gas pedal and the throttle valve in the intake manifold or the adjusting rack of the injection pump. As a result of this connection, the rotational speed of the engine may be appropriately adjusted to the desired extent without having to step up close to the tractor or remount the same.

Accordingly, it is an object of the present invention to provide a speed-reducing arrangement for tractors, particularly those tractors used in agricultural operations, in which a hydraulic clutch is used together with a control mechanism, which may be readily actuated without requiring the operating person to remount the tractor or step closely up to it between the front and rear wheels thereof.

Another object of the present invention resides in the provision of an arrangement for reducing the speed of tractors which minimizes wear and tear in the parts and therewith increases the length of life of the installation, and which enables automatic adjustment of the engine speed upon actuation of the speed control device.

Still another object of the present invention resides in the provision of a hydraulic coupling inserted in the transmission means between the engine and the driven wheels which is not subjected to the disadvantages of the prior art friction clutches used for analogous purposes.

Another object of the present invention is the provision of a control arrangement for controlling the speed of a tractor which is simple, does not involve great expenditures and which may also be readily installed into the existing tractors.

These and other objects, features and advantages of the present invention will become more obvious from the following description when taken in connection with the accompanying drawing, which shows, for purposes of illustration only, one embodiment in accordance with the present invention; and wherein.

Figure 1:
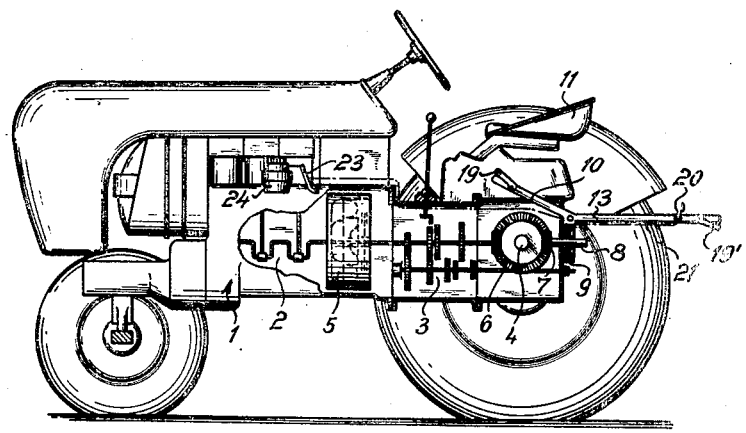
Figure 1 is a side view of a tractor provided with an installation according to the present invention, whereby the transmission means between the internal combustion engine and the driven wheels is indicated only schematically.
Figure 2:
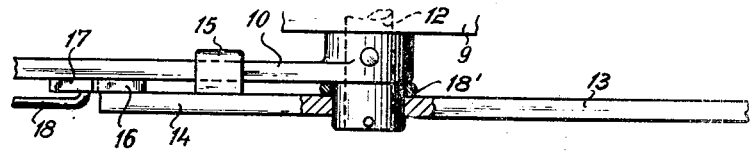
Figure 2 is a top plan view, on an enlarged scale, partially in cross section, of the brake actuating mechanism.
Figure 3:
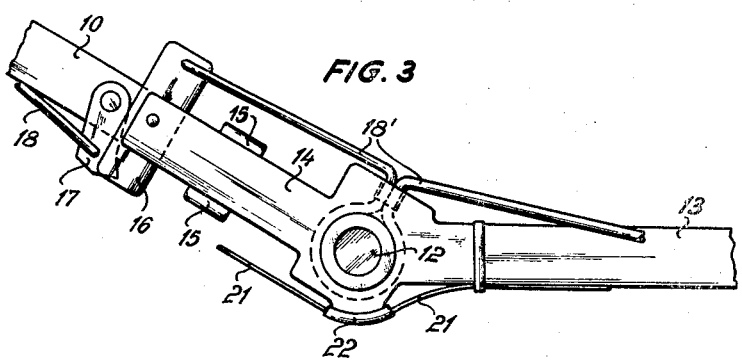
Figure 3 is a partial front elevation view of the brake actuating mechanism of Figure 2.

Referring now to the drawing, wherein like reference numerals are used throughout the various views to designate like parts, and more particularly to Figure 1, reference numeral 1 generally designates the power unit of the tractor which consists of an internal combustion engine 2, of a change-speed transmission 3, and of an axle gear 4. A hydraulic coupling 5 is operatively connected in the usual known manner between the engine 2 and the change-speed transmission 3. The driven pinion 7 of a stub shaft or coupling shaft 8 which depends on the vehicle speed is in operative engagement with the bevel gear 6 of the rear axle gear 4. The stub shaft 8 simultaneously carries the band brake 9 which constitutes a part of the usual hand brake of the tractor. The brake 9 is normally actuated from the driver's seat 11 by means of a manual brake lever 10. An additional lever 13 (Figures 1, 2 and 3) is pivotally supported on the shaft or pin 12 of the manual brake lever 10 (Figure 2). The additional lever 13 is arranged at an obtuse angle with respect to the hand lever 10 and extends rearwardly beyond the contour of the tractor. The lever 13 is provided with an extension 14 (Figures 2 and 3) which extends parallel to the hand brake lever 10 and is coupled or operatively connected therewith by projections 15. The end of the extension 14 is provided with a detent plate 16 for a locking pawl 17. The locking pawl 17 is pivoted at the manual brake lever 10 and is actuated over a linkage 18 by means of a detent release handle 19 of conventional construction. The additional lever 13 also includes a detent release handle 19' of conventional construction and is operatively connected over linkage 18' with the locking pawl 17. Furthermore, a rotary fuel adjusting device 20 of known construction is arranged at the lever 13 whose cable 21 is in operative engagement over guide means 22 with an adjusting member 23, for example, of the fuel injection pump 24.

*Operation*

If the tractor moves over the field, for example, during loading operations in one of the low speeds of the change-speed transmission, then the output of the engine 2 is transmitted over the transmission means 3—6 to the driven rear wheels. If the vehicle speed is to be reduced, then the operator merely steps laterally up to the tractor, disengages the locking pawl 17 by means of ratchet release handle 19', and pushes the lever 13 downwardly, i.e., in a clockwise direction as viewed in Figure 1, whereby the brake band 9 is tightened. The tightening or braking moment caused thereby is effective over the transmission 3, 4 on the hydraulic clutch 5, whereby the latter operates with slippage so that the vehicle speed becomes more or less low depending on the extent of the tightening moment obtained thereby. Simultaneously therewith, the cable 21 is adjusted by the change in the position of the lever 13 in the sense of a reduction of the engine speed. The reduction of the vehicle speed takes place in a stepless manner, i.e., continuously variable manner, and may be operated up to complete standstill of the vehicle. If the vehicle is halted, then with the aid of the adjusting device 20, the engine may be adjusted to idling speed thereof so that an excessive heating of the hydraulic oil in the clutch 5 is avoided. After release of the lever 13, the tractor again operates with its initial velocity. In view of the rearward projection of the lever 13 beyond the normal contours of the tractor, the operator may perform the control adjustments thereof while standing slightly laterally and to the rear of the tractor.

While I have shown and described one embodiment in accordance with the present invention, it is understood that the same is not limited thereto but is susceptible of many changes and modifications within the spirit and scope of the present invention, and I, therefore, intend to cover all such changes and modifications as encompassed by the appended claims.

I claim:

1. An arrangement for reducing and stopping the vehicle speed of engine-driven tractors while a speed of the transmission thereof remains engaged comprising a change-speed transmission and at least one driven wheel connected to be driven by said transmission, means including a hydraulic clutch providing a fluid coupling for connecting said engine with said change-speed transmission, a driven shaft operatively connected with said driven wheel and rotatable at a speed dependent on the speed of rotation of said wheel, brake means on said tractor for braking said driven shaft while a speed of said change-speed transmission remains engaged and while said transmission is operatively coupled to the engine by the hydraulic clutch, said brake means including lever means so constructed and arranged as to be actuated by the operator while standing dismounted near the tractor for controlling braking of said shaft by the brake means, and adjusting means operatively connected with said brake means for adjustment, by actuation of said lever means to brake said shaft, for adjusting the rotational speed of said engine.

2. An arrangement according to claim 1, wherein said lever means includes a hand brake lever actuatable by the operator from the driver's seat, a further lever projecting beyond said tractor, and means operatively connecting said further lever with said hand brake lever.

3. An arrangement according to claim 2, wherein said further lever is pivotally supported about the pivot axis of said hand brake lever and includes an extension parallel to said hand brake lever for connection therewith by said last-mentioned means.

4. An arrangement according to claim 3, further comprising detent means common to both said levers.

5. An arrangement according to claim 1, wherein said engine includes a fuel adjusting member, wherein said lever means includes a hand brake lever and an auxiliary lever operatively connected therewith and adapted to be actuated by the operator while off said tractor, and wherein said adjusting means includes a Bowden-wire connecting said auxiliary lever with said adjusting member.

6. An arrangement for reducing and stopping the vehicle speed of tractors having a driving engine, a change-speed transmission and at least one driven wheel, comprising transmission means including a hydraulic clutch providing a fluid coupling for connecting said engine with said driven wheel, a driven shaft operatively connected with said driven wheel to rotate at a speed proportional to the speed of said driven wheel, and brake means on said tractor for braking said driven shaft for braking said driven shaft while a speed of said change-speed transmission remains engaged and while said transmission means operatively couples the driven wheel with said engine, said brake means including lever means so constructed and arranged as to be actuated by the operating person while off the tractor for controlling braking of said shaft by the brake means, said brake means being so constructed and arranged as to be selectively actuated by said lever means to effect both continuous variable reduction of the rotatable speed of said shaft by brake slippage and braking of said shaft to a standstill, said clutch operating with slippage dependent on the braking action of said brake means on said shaft.

7. An arrangement according to claim 6, wherein said lever means includes a brake lever projecting beyond the contours of said tractor.

8. An arrangement according to claim 7, wherein said brake lever extends rearwardly beyond the tractor contours.

9. An arrangement according to claim 8, further comprising means on said brake lever for adjusting the rotational speed of said engine.

References Cited in the file of this patent

UNITED STATES PATENTS

| | | |
|---|---|---|
| 1,467,658 | Thomson | Sept. 11, 1923 |
| 1,595,523 | Oliver | Aug. 10, 1926 |
| 1,873,458 | Murnane | Aug. 23, 1932 |
| 2,548,240 | Reeder et al. | Apr. 10, 1951 |
| 2,555,417 | Martin | June 5, 1951 |
| 2,631,700 | Long et al. | Mar. 17, 1953 |
| 2,711,100 | Thorpe et al. | June 21, 1955 |
| 2,764,897 | McCallum | Oct. 2, 1956 |